United States Patent [19]

Oberg

[11] Patent Number: 4,658,508

[45] Date of Patent: Apr. 21, 1987

[54] ELECTRONIC LEVEL MEASURING SYSTEMS FOR TRUCK TRAILERS

[75] Inventor: Neil G. Oberg, Longmont, Colo.

[73] Assignee: Cardel, Inc., Loveland, Colo.

[21] Appl. No.: 824,114

[22] Filed: Jan. 30, 1986

[51] Int. Cl.⁴ .............................. G01C 9/06; B60Q 1/52
[52] U.S. Cl. .................................... 33/333; 33/366; 340/52 H; 340/689
[58] Field of Search ................ 33/333, 335, 347, 366, 33/185 V; 340/52 H, 689

[56] References Cited

U.S. PATENT DOCUMENTS

| | | | |
|---|---|---|---|
| 2,772,411 | 11/1956 | Cooper | 33/333 X |
| 3,295,219 | 1/1967 | Stockton et al. | 33/366 |
| 3,464,755 | 9/1969 | Brown . | |
| 3,512,836 | 5/1970 | Polich, Jr. . | |
| 3,640,578 | 2/1972 | Finney . | |
| 3,657,695 | 4/1972 | Birmingham . | |
| 3,797,124 | 3/1974 | Easterling et al. | 33/366 X |
| 3,921,128 | 11/1975 | Snead . | |
| 3,941,111 | 6/1976 | Wyrick, Jr. . | |
| 4,145,682 | 3/1979 | Cook . | |
| 4,278,854 | 6/1981 | Krause . | |
| 4,349,809 | 9/1982 | Tomes . | |
| 4,446,628 | 5/1984 | Shkolnik et al. | 33/366 |
| 4,567,666 | 2/1986 | Neis et al. | 33/366 |

*Primary Examiner*—William D. Martin, Jr.
*Attorney, Agent, or Firm*—Fields, Lewis, Pittenger & Rost

[57] ABSTRACT

An electronic level measuring device is provided for a tractor trailer in which a remote level sensing device is mounted on the rear frame of the trailer and a meter for indicating continuously the amount the trailer is tilted laterally is provided in the cab of the tractor. The meter also indicates the direction of tilt and changes scale when the tilt exceeds a predetermined amount. The device will work with reverse polarity and provides a continuous reading to the driver of the truck.

5 Claims, 9 Drawing Figures

U.S. Patent  Apr. 21, 1987  Sheet 1 of 3  4,658,508
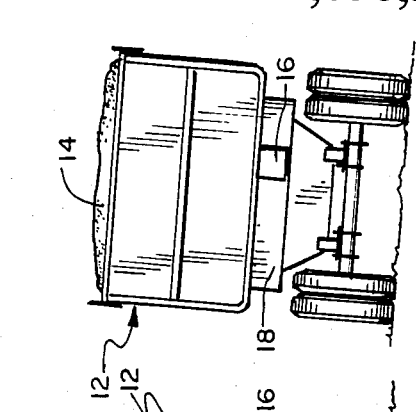
Fig-1
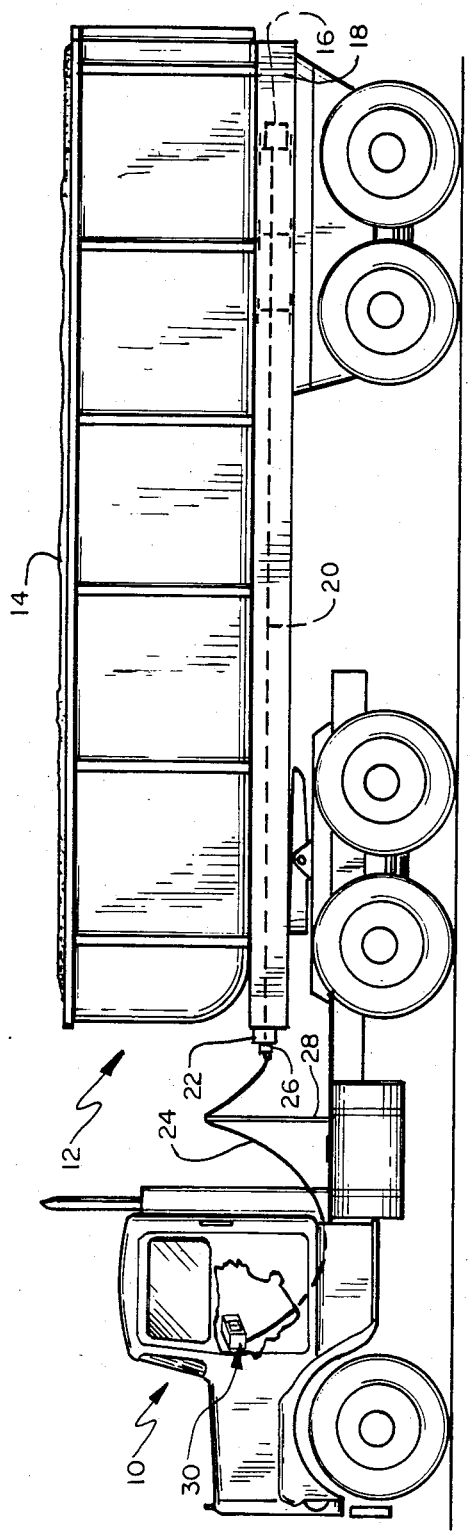
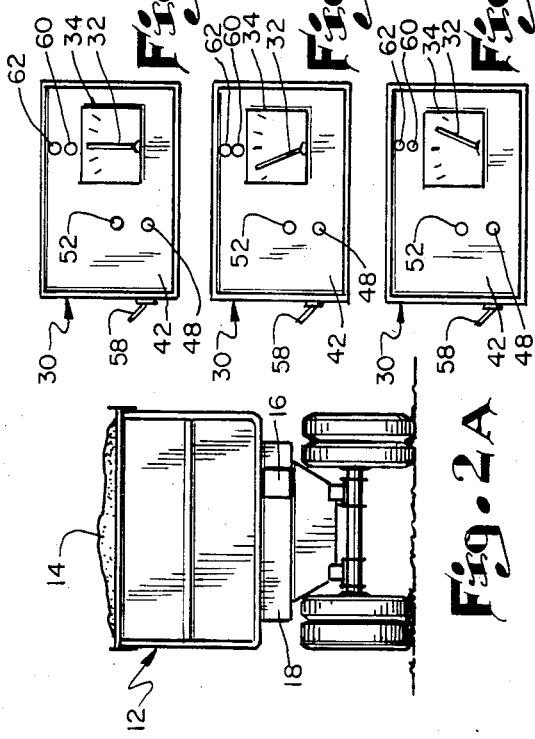
Fig-4A
Fig-3A
Fig-2B
Fig-3B
Fig-4B
Fig-2A

ELECTRONIC LEVEL MEASURING SYSTEMS FOR TRUCK TRAILERS

TECHNICAL FIELD

This invention relates to a level sensing device for tractor trailers and more particularly to one in which a sensing unit is mounted on the trailer and an instantaneous and continuous readout is provided in the cab of the tractor.

BACKGROUND ART

In most instances when a tractor trailer dump truck is to be dumped, it is at an off-highway location where the terrain is irregular. Because of the length of the tractor trailer, even though the tractor may be on substantially level ground, the rear wheels of the trailer may not be. If the driver is not aware of this condition and raises the bed of the trailer, the load may shift to the low side. The trailer and the tractor can be turned over by this off-center load. When this occurs, it not only disrupts the delivery of the material in the trailer but causes extensive damage to the tractor and trailer. In addition, substantial costs are incurred in uprighting the tractor and trailer and also insurance costs are higher because of the damage encountered.

Many attempts have been made to provide devices on the tractor trailers to indicate when the vehicle or the load is off-center by a predetermined amount. One of these is shown in U.S. Pat. No. 3,921,128 to Snead, entitled "Truck Roll Warning System" which has a sensing device mounted on the dump bed which is responsive to a predetermined amount of tilt to cause the dump bed to be lowered and a warning signal to be provided. U.S. Pat. No. 4,145,682 to Cook, entitled "Semi-Dump Truck level Indicator" is directed to a level sensing device mounted on a dump bed having mercury switches which are responsive to a tilt either to the left or right and give an indication of the direction of tilt once a predetermined amount of tilt has occurred. Another tilt indicating device is shown in U.S. Pat. No. 4,278,854 to Krause, entitled "Tilt Indicating Device" wherein a float in a body of liquid will tilt in response to the tilt of the vehicle and complete a circuit to indicate when a predetermined amount of tilt has occurred. U.S. Pat. No. 3,464,755 to Brown, entitled "Dump Trailer Safety Device" provides a dump valve override which senses when the tilt is beyond a predetermined angle and overrides the dump valve. U.S. Pat. No. 3,657,695 to Birmingham, entitled "Leveling Indicator" discloses a level indicating device for mounting on a trailer which can be viewed from the vehicle while backing up the trailer and will give an indication as to both lateral and longitudinal tilt when it exceeds a predetermined amount. U.S. Pat. No. 4,349,809 to Tomes, entitled "Offroad Vehicle Inclinometer and Alarm" will provide an instantaneous and continuous indication of tilt of an offroad vehicle as that vehicle is being driven across the terrain. However, it is not intended for use on a tractor trailer. Thus, the deficiency of all of the devices which are intended for tractor trailers is that there is no continuous reading of the degree of tilt of the bed and by the time the predetermined angle is reached, the bed may have been raised so high that it is too late to prevent it from tilting over.

The following patents are directed to devices for automatically leveling the loads: U.S. Pat. No. 3,041,111 to Wyrick, Jr., entitled "Automatic Load Leveling System"; U.S. Pat. No. 3,512,836 to Polich, Jr., entitled "Lateral Stabilizing Means for a Semi-Trailer Dump Body"; and U.S. Pat. No. 3,640,578 to Finney, entitled "Leveling System for Semi End Dump Trucks". While these devices are satisfactory to their intended purpose, they are very costly and therefore not normally incorporated in the conventional tractor trailer.

DISCLOSURE OF THE INVENTION

In accordance with this invention, an electronic level monitoring device is provided for use with a truck having a tractor and a trailer. This device comprises a remote level sensor for attachment to the rear frame of the trailer. The sensor provides an output signal which is proportional to the angle of lateral tilt of the trailer which is of one polarity when the trailer is tilted to the left and is of opposite polarity when the trailer is tilted to the right. A source of electrical power is connected to the sensor and a meter is mounted in the cab of the tractor which provides a continuous reading of the amount of the angle of tilt and the direction of tilt of the trailer frame in response to the output signal.

In addition, the level sensor can include means for leveling it on the trailer frame prior to use. The signal is transmitted by means of a first cable running from the sensor to a junction box and a second cable from the junction box to the meter. The meter gives a continuous reading and includes a first light that indicates when the trailer is sufficiently level for dumping and a second override light which indicates when the trailer is tilted beyond a predetermined amount, say 4°. The meter also includes a scale multiplier so that when the bed tilts beyond a predetermined level, such as 4°, the scale on the meter is extended, such as 10 times the original scale. The electrical power source is the vehicle battery which is connected through the ignition. A polarity converter is provided so that the polarity of the battery terminals is unimportant.

As can be seen, with applicant's device, the continuous reading is given so that the driver knows at all times how level the rear frame of the trailer is when he backs up into dumping position and he can monitor it during the entire dumping cycle. Thus, the changes of tipping the tractor and trailer over are greatly minimized.

Additional advantages of this invention will become apparent from the description which follows, taken in conjunction with the accompanying drawings.

BRIEF DESCRIPTION OF THE DRAWINGS

FIG. 1 is a side elevation of a tractor trailer equipped with the level measuring device of this invention, parts being broken away for clarity of illustration;

FIG. 2A is a rear view of the trailer of FIG. 1, shown in a level position;

FIG. 2B is a front elevation of a meter showing the position of the needle when the bed is level as in FIG. 2A;

FIG. 3A is a rear elevation of the trailer of FIG. 1 showing the trailer tipped to the left;

FIG. 3B is a front elevation of the meter showing the position of the needle when the trailer is tipped in FIG. 3A;

FIG. 4A is a rear elevation of the trailer of FIG. 1 showing the trailer tipped to the right;

FIG. 4B is an elevation of the meter showing the position of the needle when the trailer is tipped as in FIG. 4A;

BEST MODE FOR CARRYING OUT THE INVENTION

Figure 5A:
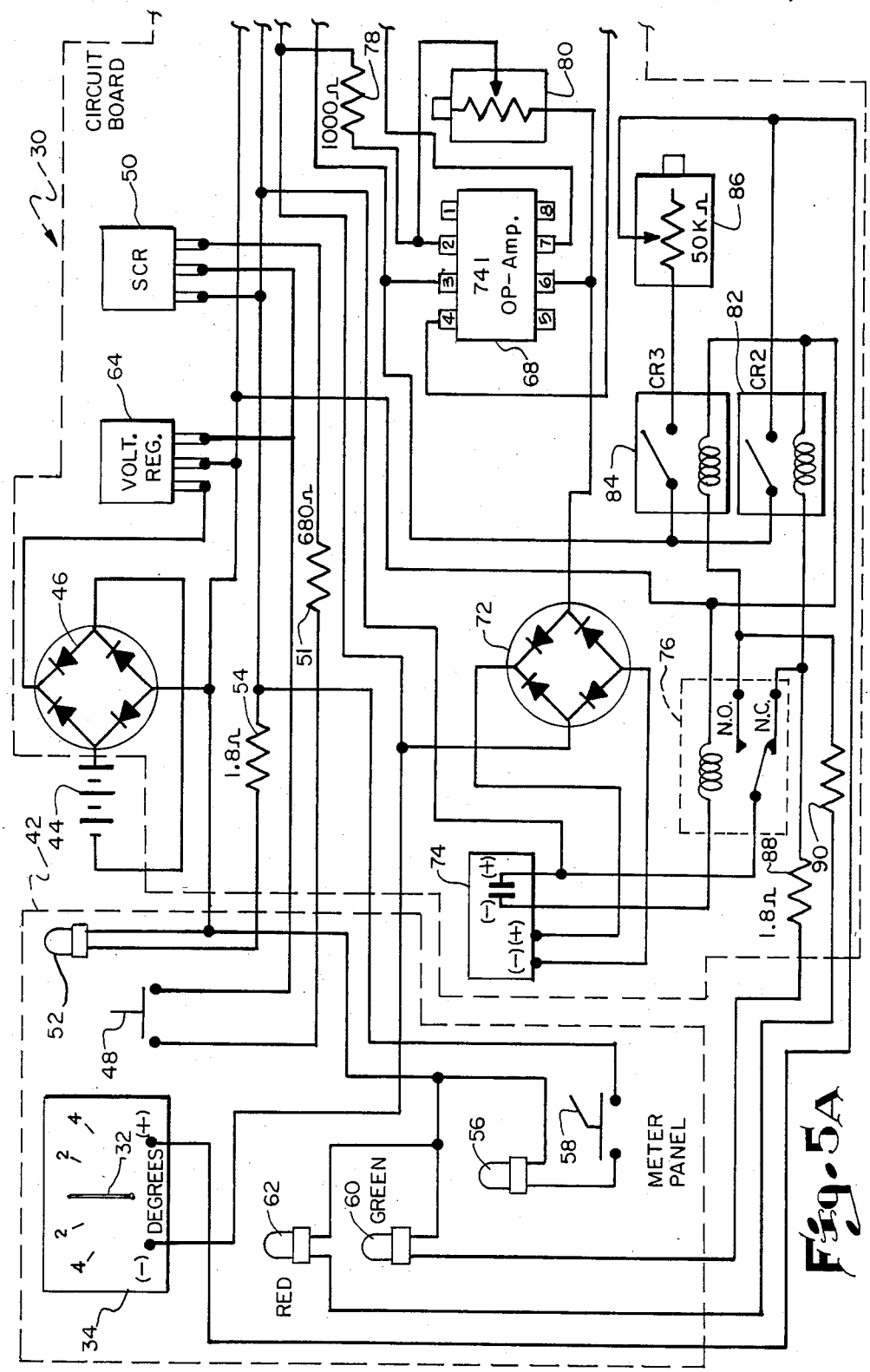
FIG. 5A is a portion of the circuit diagram of the level measuring device of this invention.

A dump truck is illustrated in FIG. 1 which has a tractor 10 and a trailer 12 carrying a load 14. A level sensor box 16 is mounted on the rear frame 18 of trailer 12 and is connected by means of a conduit 20, which runs along the under side of trailer 14, to a junction box 22. A second conduit 24 is connected to junction box 22 by means of a connector 26 and extends between junction box 22 and the cab of tractor 12, being carried by support 28. The other end of conduit 24 is connected to a meter 30 mounted in the cab, such as on or under the dashboard.

As will be explained more fully below, when the trailer is in the level position shown in FIG. 2A, the needle 31 of meter 30 will be in the center position indicating that there is no tilt of the trailer. On the other hand, when the trailer is tilted to the left as shown in FIG. 3A, the needle 31 will also move to the left as shown in FIG. 3B and indicate the angle of tilt. Similarly, when the trailer is tilted to the right as shown in FIG. 4A, the needle 31 will move to the right as shown in FIG. 4B to show the degree of tilt to the right.

Figure 5B:
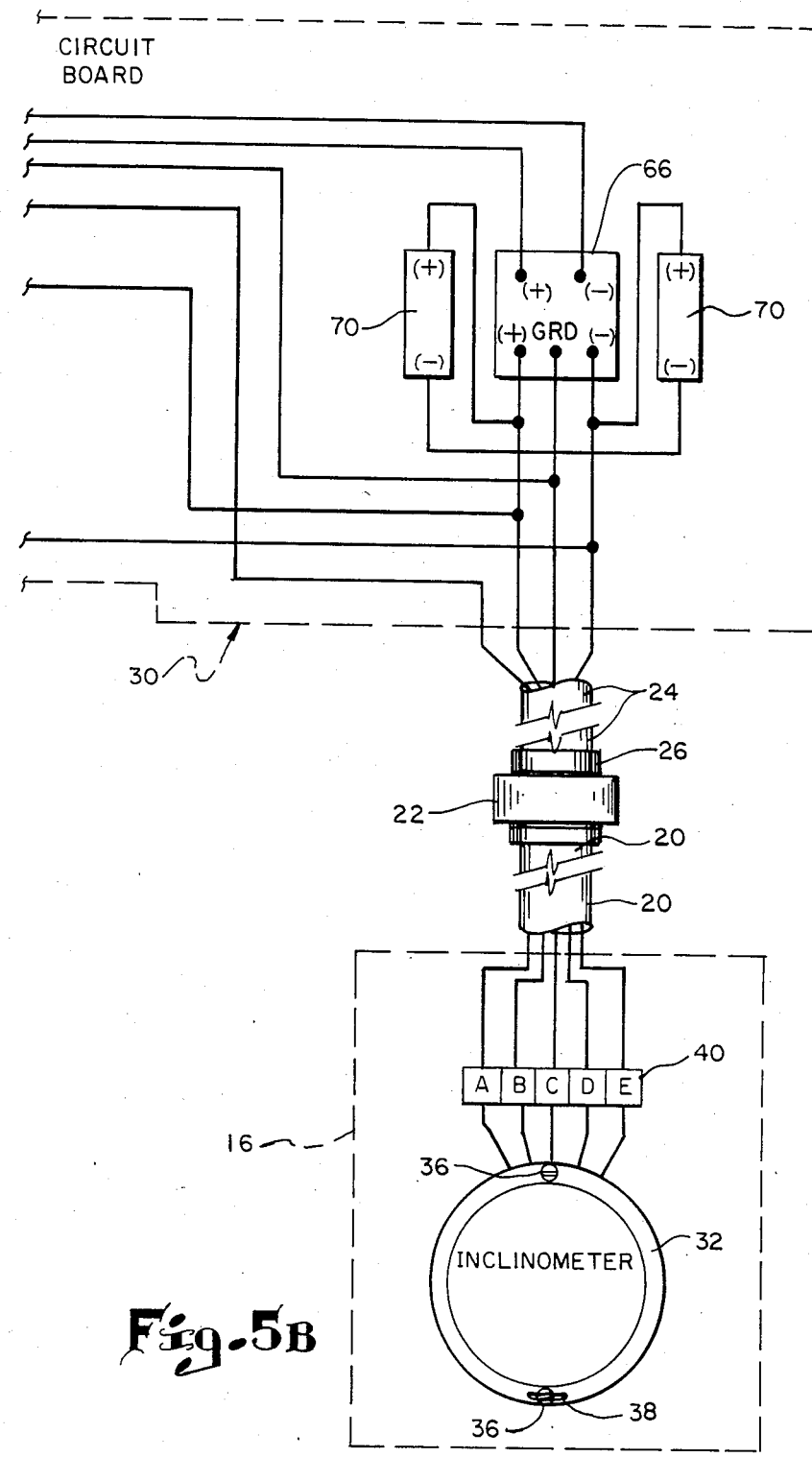
FIG. 5B is the remainder of the circuit diagram of the level measuring device of this invention.

Conveniently, the level sensor box 16 is attached securely to the truck frame 18, as by bolts (not shown), as best seen in FIG. 5B, within level sensor box 16 an inclinometer or level sensor 32 is mounted as by a pair of screws 36. Conveniently, the bottom of the sensor has a slot 38 for receiving screw 36 and adjusting the level sensor to be sure that it is perfectly level when the frame 18 of the truck is level. A suitable inclinometer is manufactured by Sperry Sensing Systems, a division of Sperry Corporation, P.O. Box 21111, Phoenix, Ariz. 85036 as Model No. 02338-30, which has an analog output signal. The inclinometer has five leads as shown connected to a junction block 40 as shown, which is mounted within level sensor box 16. Conduit 20 includes a four-wire connector whose wires are connected to the junction block 40, as shown. The conduit 20 is in the form of a shielded cable.

As previously described, the other end of the cable connects to junction box 22, at the front of the trailer, which in turn is connected to conduit 24 through any suitable four-prong trailer disconnect 26.

The meter box 30 includes meter panel 34 having a needle 31, as previously described. A suitable meter panel is manufactured by Crompton Instruments, 1562A Parkway Loop, Tustin, Calif. 92680, under Model No. 223-01. Conveniently, meter panel 34 is mounted in a front panel 42 of meter box 30. Power for the level sensor and meter are provided by the vehicle battery 44. The battery can be either 12 or 24 volts and is connected to a polarity converter 46 in the form of a full wave bridge that insures correct voltage polarity to all electronic components regardless of the vehicle battery polarity. A suitable full wave bridge is Archer Part No. 276-1151, distributed by Radio Shack of Fort Worth, Tex.

To activate the system, normally open power-on button 48 is momentarily depressed after the vehicle ignition has been turned on to activate silicon controlled rectifier 50 to provide continuous power to the system. A suitable rectifier is Archer Part No. 276-1067, also manufactured by Radio Shack. The gate voltage to switch 48 is reduced through resistor 51. As shown in FIG. 5A, the silicon controlled rectifier is connected to power-on LED 52 through resistor 54, the opposite side of the lamp being connected to rectifier 46. Connected in the same circuit is a panel light 56 which can be activated by switch 58. The panel light is for backlighting the meter panel when the ambient light is not sufficient to see it. Finally, a dump LED 60 and an override LED 62 are provided on the panel. Dump LED 60 may be green in color and indicate that the angle of tilt is within acceptable limits for dumping whereas override LED 62 may be red to indicate that the trailer bed is tipped beyond the acceptable limits and that the dumping operation should be interrupted until this condition can be corrected.

Conveniently, a voltage regulator 64 is connected between bridge 46 and SCR 50 and will accept a wide range of voltage inputs between 12 and 35 volts DC. A suitable voltage regulator is Archer Part No. 276-1771, distributed by Radio Shack. It provides a regulated output voltage of 12 volts DC to the rest of the system. A dual output power supply 66, shown in FIG. 5B, provides a +15 volts DC and −15 volts DC relative to common ground from a single power source. A suitable power supply is Pico Part No. 12A15D, manufactured by Pico Electronics of Mount Vernon, N.Y. This is used to supply power to level sensor 32 and to the operational amplifier 68, shown in FIG. 5A. A suitable operational amplifier is Archer Part No. 276-007, distributed by Radio Shack. The operational amplifier looks directly at the output signal from level sensor 32. This input signal is then amplified to a more useful voltage that will switch a network of relays that determines a low or high scale reading, as more fully discussed below. The two capacitors 70 associated with dual output power supply 66 work in conjunction therewith to provide a filtered 15 volt DC power source of either polarity.

A second polarity converter 72, which is in the form of a full wave bridge rectifier, receives a signal from operational amplifier 68 which is either positive or negative in polarity, depending on whether level sensor 32 is tipped to the left or the right. This may be identical to full wave bridge rectifier 46. The signal is polarized and provides an input to solid state switch 74. A suitable solid state switch is Gray Hill Part No. GRA 7052-01-A-03V, distributed by CSID, Inc. of Denver, Colo. This solid state switch, which is normally open, is used to switch control relay 76 from a smaller signal to a higher signal from operational amplifier 68 and polarity converter 72 at a predetermined and preset voltage when the tilt of the trailer exceeds 4° in either direction. A suitable control relay is Archer Part No. 275-247, distributed by Radio Shack. Multiple resistors 78 and 80 are used in conjunction with operational amplifier 68 to provide for proper amplification. Resistor 80 is adjusted to turn solid state switch 74 on when the input signal to operational amplifier 68 is at maximum to correspond with more than a 4° tilt indicated by the meter. The meter is scaled to read at either an actual scale or at 10 times the actual scale and when solid state switch 74 is turned on, the meter will be on the high scale.

As can be seen from FIG. 5A, control relay 76 is a one pole, double throw switch which is activated by current from solid state switch 74. The normally closed position will provide the low scale position but when activated will provide the high scale position by closing the normally open side of the switch. A second control relay 82 is activated from control relay 76 when it is in the normally closed position. This allows a signal from level sensor 32 to pass directly to the meter 34 for a low scale reading. A third control relay 84, which is identical to control relay 82, is activated from control relay 76 when the normally open contact is closed. This allows a signal from the level sensor 32 to pass to the scale multiplier resistor 86 which provides the high scale operation. The output from the normally closed side of control relay 76 passes through a resistor 88 and from the normally open side through resistor 90 to reduce the voltage to the dump mode LED 60 and the override LED 62. Suitable control relays 82 and 84 are Gordos Part No. 5-16710, distributed by Newark Electronics of Denver, Colo.

From the foregoing, the advantages of this invention are readily apparent. A remote level sensor located on the back frame of a truck trailer can be read out remotely on a meter located in the cab of the tractor. The device is made of solid state parts, most of which are contained in the meter box so as not to be exposed to the elements. The device is durable and shock proof and monitors the position of the trailer as it is backed into position and as the box is raised. Thus, the driver has a continuous indication of the level of the trailer bed during both the backing and dumping operation so that should the level of the trailer shift out of a predetermined acceptable limit, such as in excess of 2° left or right, the dumping operation can be terminated. Of course, if the trailer is tilted more than this amount to begin with, the dumping operation will not even be begun. The device will work with reverse polarity and a scale is provided which changes if the tilt is over 4° so that even higher amounts of tilt can be read on a very sensitive scale.

This invention has been described in detail with reference to a particular embodiment thereof, but it will be understood that various other modifications can be effected within the spirit and scope of this invention.

What is claimed is:

1. An electronic level measuring device for use with a truck having a tractor and a trailer frame, said device comprising:

a remote lever sensor for attachment to the rear of the trailer frame, said sensor providing an output signal which is proportional to the angle at which the trailer frame is tilted laterally from the horizontal and which is of one polarity when the trailer frame is tilted to the left and is of opposite polarity when the trailer frame is tilted to the right;

a source of electrical power connected to said sensor;

a meter for mounting in the cab of the tractor which provides a continuous reading of the amount of the angle of tilt and the direction of tilt of the trailer frame is response to said output signal and provides a warning signal when the angle of tilt exceeds a predetermined amount;

a first conduit having a first end connected to said level sensor;

a junction box mountable at the front of the trailer frame, a second end of said first conduit being connected to said junction box;

a meter box in which said meter is mounted;

a second conduit having a first end connected to said meter box; and a quick disconnect connected to the second end of said second conduit for connecting said first and second conduits together at said junction box.

2. An electronic level measuring device for use with a truck having a tractor and a trailer frame, said device comprising:

a remote level sensor for attachment to the rear of the trailer frame, said sensor providing an output signal which is proportional to the angle at which the trailer frame is tilted laterally from the horizontal and which is of one polarity when the trailer frame is tilted to the left and is of opposite polarity when the trailer frame is tilted to the right;

a meter for mounting in the cab of the tractor which provides a continuous reading of the amount of the angle of tilt and the direction of tilt of the trailer frame in response to said output signal;

a meter box in which said meter is mounted;

a circuit board in said meter box, said circuit board including:

a dual output power supply connectable to the battery for providing power to the level sensor;

an operational amplifier which is powered from said dual output power supply and receives and amplifies said output signal from said level sensor;

means for changing the scale of said meter in response to the value of said amplified output signal;

a first LED which is activated when the signal to said meter indicates that the angle of tilt of the level sensor is within acceptable limits; and a second LED which is activate when the signal to said meter indicates that the angle of the tilt of the level sensor is beyond acceptable limits; and means transmitting said output signal from said sensor to said meter.

3. Apparatus, as claimed in claim 2, wherein said scale changing means includes:

a polarity converter connected to said operational amplifier to receive said amplified output signal to convert it to a signal of constant polarity;

a solid state, normally open, switch connected to the output of said polarity converter which is activated at a preset voltage from said amplified output signal;

a first control relay which in normally closed position provides an output to operate said meter at low scale;

a second control relay which is normally open and closed by said first control relay allows said output signal from said level sensor to pass directly to said meter; and a third control relay which is normally open but is closed when said first control relay energizes when the signal to said solid state switch exceeds a predetermined level to provide a high scale signal to said meter.

4. Apparatus, as claimed in claim 3, further including: adjustable resistors in said circuit board for adjusting the high scale of the meter.

5. Apparatus, as claimed in claim 3, further including:

a second polarity converter to insure correct voltage regardless of the polarity connection to the battery; and a voltage regulator connected to the output of said second polarity converter to provide a constant output voltage to the other components of the circuit.

* * * * *